May 5, 1953   G. M. TURNER   2,637,569
TANDEM SUSPENSION FOR TRACTORS AND TRAILERS
Filed June 27, 1951   2 SHEETS—SHEET 1
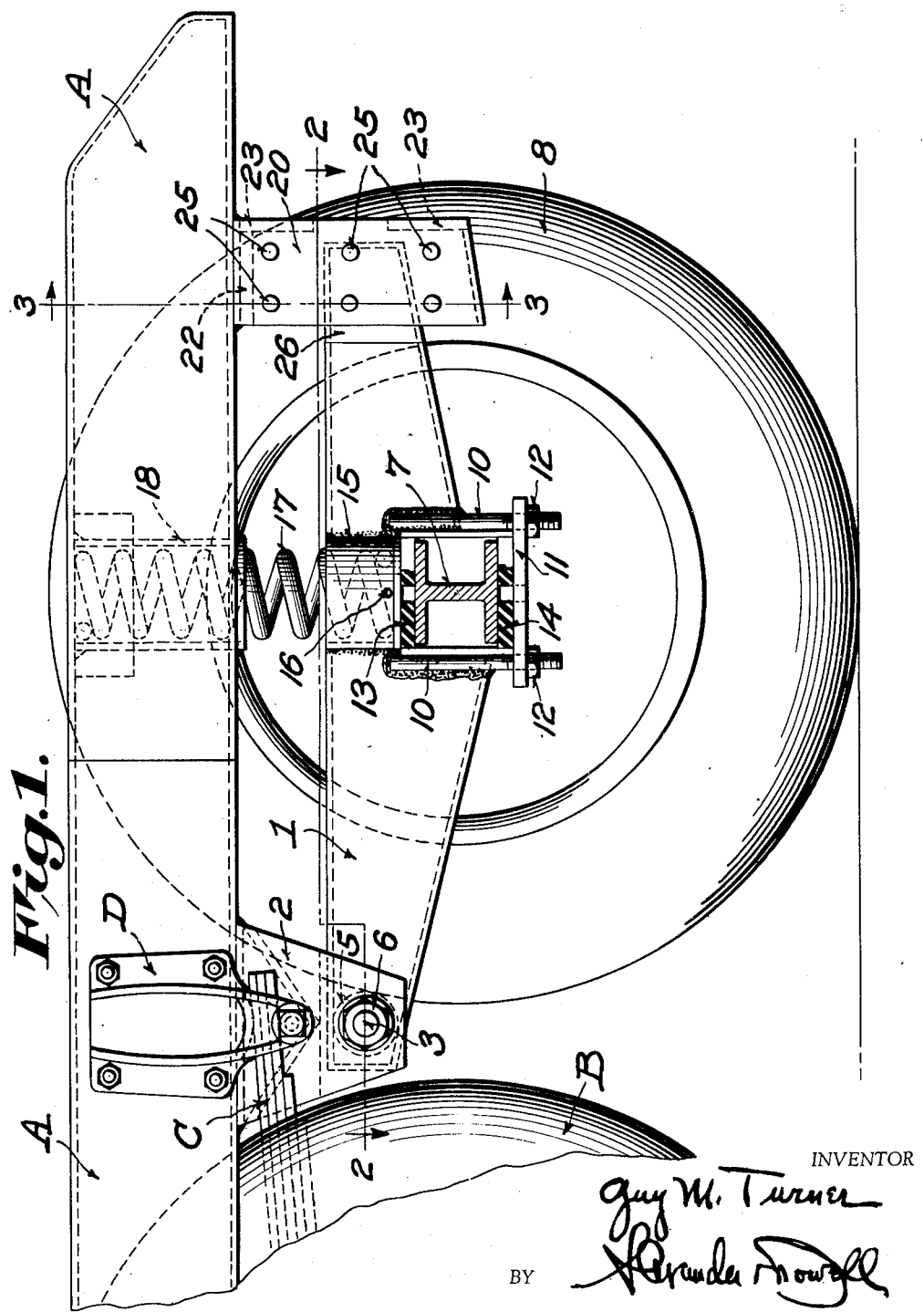
INVENTOR
Guy M. Turner
BY
ATTORNEYS May 5, 1953 G. M. TURNER 2,637,569
TANDEM SUSPENSION FOR TRACTORS AND TRAILERS
Filed June 27, 1951 2 SHEETS—SHEET 2
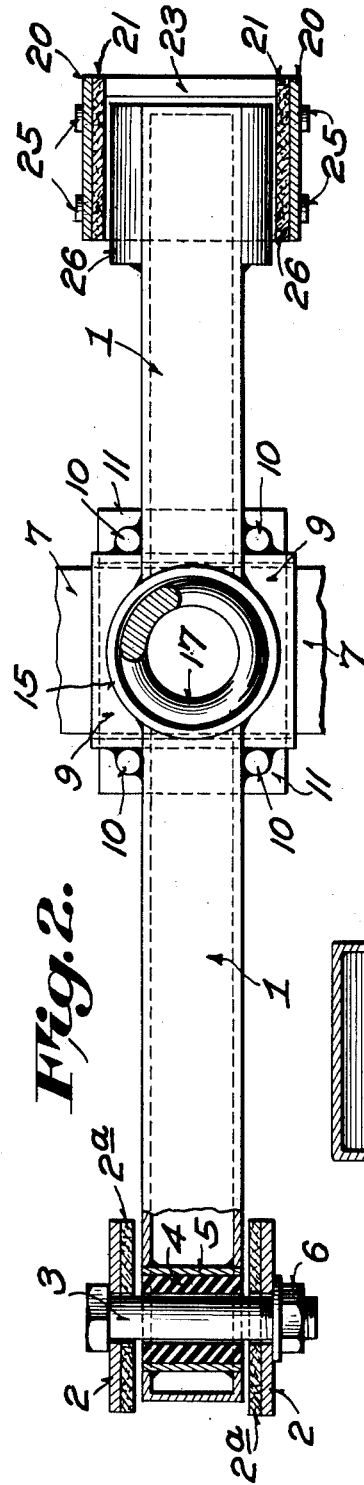
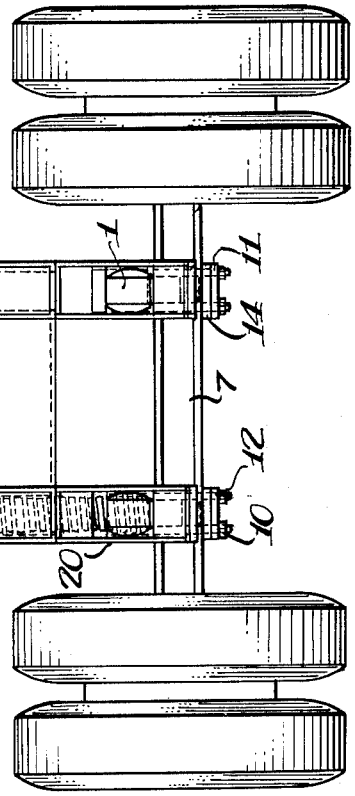
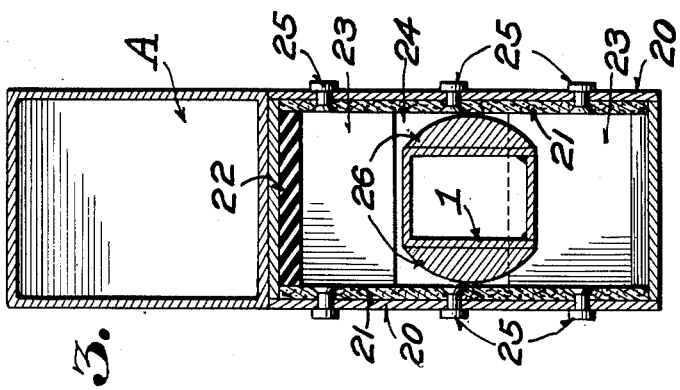
INVENTOR
Guy M. Turner
BY
ATTORNEYS Patented May 5, 1953

2,637,569

UNITED STATES PATENT OFFICE 2,637,569

TANDEM SUSPENSION FOR TRACTORS AND TRAILERS

Guy Manning Turner, Greensboro, N. C.

Application June 27, 1951, Serial No. 233,768

6 Claims. (Cl. 280—124)

This invention is a novel improvement in tandem suspensions for tractors, trailers, or the like, and the principal object thereof is to provide an auxiliary suspension unit which can be installed without the removal or modification of the drive running gear of the tractor, since there is no direct attachment to the drive axle casing or springs suspending the same.

Another object of the invention is to provide a tandem suspension of the above type which will be simple, novel, and efficient, and which embodies a minimum number of parts.

Other minor objects of the invention will be hereinafter set forth.

I will explain the invention with reference to the accompanying drawings, which illustrate one practical embodiment thereof, to enable others familiar with the art to adopt and use the same; and will summarize in the claims, the novel features of construction, and novel combinations of parts, for which protection is desired.

In said drawings:

Figure 1 is a side elevation, partly in section, showing the rear end of a tractor or trailer frame, with my suspension unit attached thereto forward of or in rear of the normal rear wheels of the tractor or trailer to permit tandem conversion.

Fig. 2 is an enlarged horizontal section on the line 2—2, Fig. 1.

Fig. 3 is an enlarged vertical section on the line 3—3, Fig. 1.

Fig. 4 is an end elevation of the rear end of the tractor or trailer frame.

As shown, the tractor or trailer is provided with a frame including side members A (Fig. 1) and with normal rear wheels B, which are mounted on leaf springs C or the like, the rear ends of which are pivoted in brackets D, the frame members A extending in rear of the wheels B. The details of construction of the members A—B—C—D form no part of my present invention.

My tandem suspension unit is applied to the rear end of the vehicle frame, as shown more particularly in Fig. 1, same comprising a pair of walking beams 1 disposed under each of the side members A of the vehicle body, said walking beams being of substantially rectangular cross section, as shown in Fig. 3, and preferably increasing in depth from their ends towards their centers. The forward end of each walking beam 1 is mounted in a U-shaped bracket 2 having its base secured by welding or the like to the under side of the related side frame A, the legs of the bracket being spaced apart an amount somewhat greater than the width of the walking beam.

The legs of the bracket 1 have aligned holes for the reception of a pin or bolt 3 which transfixes the legs of the bracket 2, bolt 3 passing through a rubber bushing 4 which is confined in a metal bushing 5 (Fig. 2), the ends of which are secured to and open through the sides of the walking beam, bolt 3 being retained in place by nut 6 or the like, whereby the walking beam is free to pivot vertically on the bolt 3 while at the same time being permitted to shift slightly laterally, or to twist laterally on the bolt 3, the metal bushing 5 serving as a retainer for the rubber bushing 4.

The inner walls of each bracket 2 adjacent the bolt 3 are lined with steel or other shim plate 2a adapted to engage the sides of the walking beam 1 when the latter is subject to lateral movement or twist.

In the lower central portion of each walking beam 1 is a recess preferably of rectangular shape, receiving axle 7 of the tandem suspension unit, the axle 7 passing under the side frames A and carrying on each end single or dual wheels 8 which are journaled on the axle in any desired manner. The particular shape of the axle (whether rectangular, round, solid or hollow) forms no part of my present invention, nor the particular means for mounting the wheels 8 on the axle 7.

Preferably the axle is received in a rectangular box 9 housed in the recess, the box 9 having an open lower end, and being of somewhat greater width than the walking beam 1 and somewhat larger in width than the width of the axle 7, as clearly shown in Fig. 2, the box 9 being preferably securely welded within the recess in the walking beam 1 so as to form an integral part thereof.

At each side of the walking beam 1 adjacent the forward and rear ends of the box 9 are bolts 10 which are welded in the corners formed by the parts, as shown in Figs. 1 and 2, and which project below the lower faces of the walking beams 1, the same being threaded on their lower ends. Cap plates 11 (Fig. 1) are mounted upon the lower ends of the bolts 10 and are maintained in position thereon by means of nuts 12 on the threaded lower ends of the bolts 10.

Rubber pads 13 and 14 (Fig. 1) are provided in the boxes 9 of walking beams above and below the axle 7, as shown in Fig. 1, the pads 13 and 14 serving to dissipate the torque created by uneven surfaces of the roadway, said pads 13 and 14 acting in conjunction with the rubber bushings 4 around the bolts 3 in the brackets 2.

In assembling the axle 7 on the walking beams the rubber pads 13 and 14 would be compressed by an amount approximately equal to one-eighth of their original thickness, thereby serving to hold the axle 7 rigid under normal use.

In the top of each walking beam 1, above the box 9 is a well 15, which is open at its top, the well being provided with a drain hole 16, and being adapted to receive and retain the lower end of a coiled spring 17, as shown in Figs. 1 and 2, while the upper end of spring 17 enters a well 18 which is open at its lower end and has its upper end securely welded into the side frame A. Spring 17 is of such strength that the same will be compressed solid under heavy loads such as, for instance, 12,000 pounds, the ends of the spring 17 being maintained at all times within the wells 15 and 18.

The rear ends of the walking beams 1 enter guide boxes 20 which are welded to the under sides of the side frames A, said guide boxes being preferably of rectangular shape, the same being lined on their inner side walls with pads 21, as shown in Fig. 2. Preferably, the pads 21 are secured to the sides of the guide boxes by countersunk rivets 25 or the like, so as to maintain their exposed surfaces within the guide boxes smooth. In the top of each guide box 20 is a rubber pad 22 (Fig. 1) serving as a limit and shock pad to prevent impact of the rear end of the walking beam against the side frame A. The rear wall of each guide box is closed by a plate 23 having a central opening 24 (Fig. 3) therein. On the rear end of each walking beam at each side thereof is a steel plate 26 having its outer face parti-cylindrical, as shown in Fig. 3, the same being normally slightly spaced from the pads 21 to alleviate binding on the sides of the guide box.

By the above construction, the pads 21 prevent wear on the metal sides of the guide boxes 20. However, when the walking beams are shifted laterally or are twisted under stress of road surface, the plates 26 may engage the pads 21 and thereby limit the lateral swinging movement of the ends of the walking beams, also twisting movement such as would be caused by uneven road surfaces.

The above construction provides a tandem suspension unit which can be applied to a tractor or trailer without the removal or modification of the drive running gear, since there is no direct attachment to the drive axle casing or to the springs suspending same; also provides a simple, novel and efficient tandem suspension in which the walking beams are permitted freedom of movement in a horizontal, vertical, or in a rolling or twisting plane when the wheels 8 of the vehicle are in a position on the road surface to create stress or strain on the assembly.

I do not limit my invention to the exact form shown in the drawings, for obviously changes may be made therein within the scope of the claims.

I claim:

1. In combination with a vehicle body supported by wheels and having side members extending beyond the rear wheels; an auxiliary tandem suspension unit comprising parallel walking beams disposed below the side members respectively adjacent to the vehicle wheels, an axle carried by said walking beams; auxiliary wheels journaled on said axle, brackets secured to the side members and having spaced side walls receiving the forward ends of the walking beams, bolts transfixing the side walls of the brackets and passing through the forward ends of the walking beams, guide boxes secured to the side members and having spaced side walls receiving the rear ends of the walking beams, parti-cylindrical plates on the sides of the walking beams within the guide boxes; compression springs interposed between the side members and the walking beams adjacent their mid-lengths, the walking beams thereby thus permitted vertical swinging movement and restricted lateral and twisting movement on said bolts under stresses due to road strains; said walking beams having recesses in their lower faces receiving said axle, bolts secured to said beams and projecting below said axle, cap plates on said bolts retaining the axle in said recesses, and resilient pads disposed between the axle, the tops of the recesses, and the cap plates.

2. In combination with a vehicle body having rear wheels connected by spring suspension to the body forward of the rear end of the body, said body having side members; an auxiliary tandem suspension unit comprising parallel walking beams disposed below the side members respectively adjacent to the vehicle wheels, an axle carried by said walking beams; auxiliary wheels journaled on said axle, brackets secured to the side members and having spaced side walls receiving the forward ends of the walking beams, metal bushings secured in and extending laterally through the sides of the walking beams; rubber bushings confined in the metal bushings, bolts transfixing the side walls of the brackets and passing through the rubber bushings, guide boxes secured to the side members and having spaced side walls receiving the rear ends of the walking beams, parti-cylindrical plates on the sides of the walking beams within the guide boxes; compression springs interposed between the side members and the walking beams adjacent their mid-lengths, the walking beams thus being permitted vertical swinging movement and restricted lateral and twisting movement on said bolts under stresses due to road strains, said walking beams having recesses in their lower faces, U-shaped boxes having open ends secured in said recesses, said boxes receiving said axle, bolts secured to said boxes and projecting below said walking beams, cap plates on said bolts retaining the axle in said boxes, and rubber pads disposed between the axle, the tops of the boxes, and the cap plates.

3. In combination with a vehicle body having rear wheels connected by spring suspension to the body forward of the rear end of the body, said body having side members; an auxiliary tandem suspension unit comprising parallel walking beams disposed below the side members respectively adjacent to the vehicle wheels, an axle carried by said walking beams; auxiliary wheels journaled on said axle, brackets secured to the side members and having spaced side walls receiving the forward ends of the walking beams, metal bushings secured in and extending laterally through the sides of the walking beams; rubber bushings confined in the metal bushings, bolts transfixing the side walls of the brackets and passing through the rubber bushings, shim plates on the inner faces of the side walls in way of the bolts, guide boxes secured to the side members and having spaced side walls receiving the rear ends of the walking beams, pads on the inner surfaces of the side walls of the guide boxes, parti-cylindrical plates on the sides of the walking beams within the guide boxes; rubber shock pads in the tops of the guide boxes; and compression springs interposed between the side members and the walking beams adjacent their mid-lengths, the walking beams thus being permitted vertical swinging movement and restricted lateral and twisting movement on said bolts under stresses due to road strains.

4. In a combination as set forth in claim 3, said walking beams having recesses in their lower faces, U-shaped boxes having open ends secured in said recesses, said boxes receiving said axle, bolts secured to said boxes and projecting below said walking beams, cap plates on said bolts retaining the axle in said boxes, and rubber pads disposed between the axle, the tops of the boxes, and the cap plates.

5. In a combination as set forth in claim 3, opposed well casings secured in the tops of the walking beams and in the undersides of the side members receiving the ends of the springs respectively.

6. An auxiliary tandem suspension unit comprising parallel walking beams; an axle carried by said walking beams; wheels journaled on said axle; metal bushings secured in and extending laterally through the sides of the walking beams adjacent one end; rubber bushings confined in the metal bushings, parti-cylindrical plates on the sides of the walking beams adjacent their other end; said walking beams having recesses in their lower faces, U-shaped boxes having open ends secured in said recesses, said boxes receiving said axle, bolts secured to said boxes and projecting below said walking beams, cap plates on said bolts retaining the axle in said boxes, and rubber pads disposed between the axle, the tops of the boxes, and the cap plates.

GUY MANNING TURNER.

References Cited in the file of this patent

UNITED STATES PATENTS

| Number | Name | Date |
|---|---|---|
| 1,069,334 | Humphrey | Aug. 5, 1913 |
| 2,558,381 | Pointer | June 26, 1951 |
| 2,579,556 | Drong | Dec. 25, 1951 |